H. H. HUGHES.

REVOLVING FURNACE FOR VOLATILIZING METALS FROM THEIR ORES.

APPLICATION FILED JAN. 20, 1910.

Reissued May 31, 1910.

13,118.

2 SHEETS—SHEET 1.

Witnesses:

Jas. E. Hutchinson.

R. S. Bacon

Inventor:

Harry H. Hughes

By F. P. Cornwall Attorney:

H. H. HUGHES.

REVOLVING FURNACE FOR VOLATILIZING METALS FROM THEIR ORES.

APPLICATION FILED JAN. 20, 1910.

Reissued May 31, 1910. 13,118.

2 SHEETS—SHEET 2.

Witnesses:

Jas. E. Hutchinson

R. J. Mason

Inventor:

Harry H. Hughes

By F. R. Cornwall Attorney:

UNITED STATES PATENT OFFICE.

HARRY H. HUGHES, OF SPRINGFIELD, MISSOURI.

REVOLVING FURNACE FOR VOLATILIZING METALS FROM THEIR ORES.

13,118. Specification of Reissued Letters Patent. Reissued May 31, 1910.

Original No. 922,906, dated May 25, 1909, Serial No. 487,836. Application for reissue filed January 20, 1910. Serial No. 539,208.

*To all whom it may concern:*

Be it known that I, HARRY HERBERT HUGHES, a citizen of the United States, residing at Springfield, in the county of Greene and State of Missouri, have invented certain new and useful Improvements in Revolving Furnaces for Volatilizing Metals from Their Ores; and I do declare the following to be a full, clear, and exact description of the invention, such as will enable others skilled in the art to which it appertains to make and use the same.

This invention relates to an improved furnace for volatilizing zinc from its ore and has for its object to provide a furnace of this kind by means of which a greater quantity of ore can be smelted within a given time and with a less quantity of fuel than with any of the types of ore volatilizing furnaces now in use.

The invention also relates to the method of treating zinc ores for recovering metallic zinc in an expeditious and economical manner.

The construction provides for an automatic feed device whereby the ore mixture is fed in continuously and with the exclusion of air.

A further object of the invention is to provide a furnace whereby a perfect condensation of the zinc vapors or fumes may be effected thus reducing the formation of zinc white or blue powder to a minimum.

A still further object of the invention is to provide a construction whereby the carbon monoxid gas may be led to the combustion chamber of the furnace to assist in the heating of the retort.

The invention further aims to provide a construction whereby the residue may be readily separated by gravity from the molten zinc ore, and both discharged without admitting air to the retort chamber.

With the foregoing and other objects in view, the invention comprises an apparatus having certain novel features of construction, combination and arrangement of parts, as will be more fully described and particularly pointed out in the appended claims.

Figure 1:
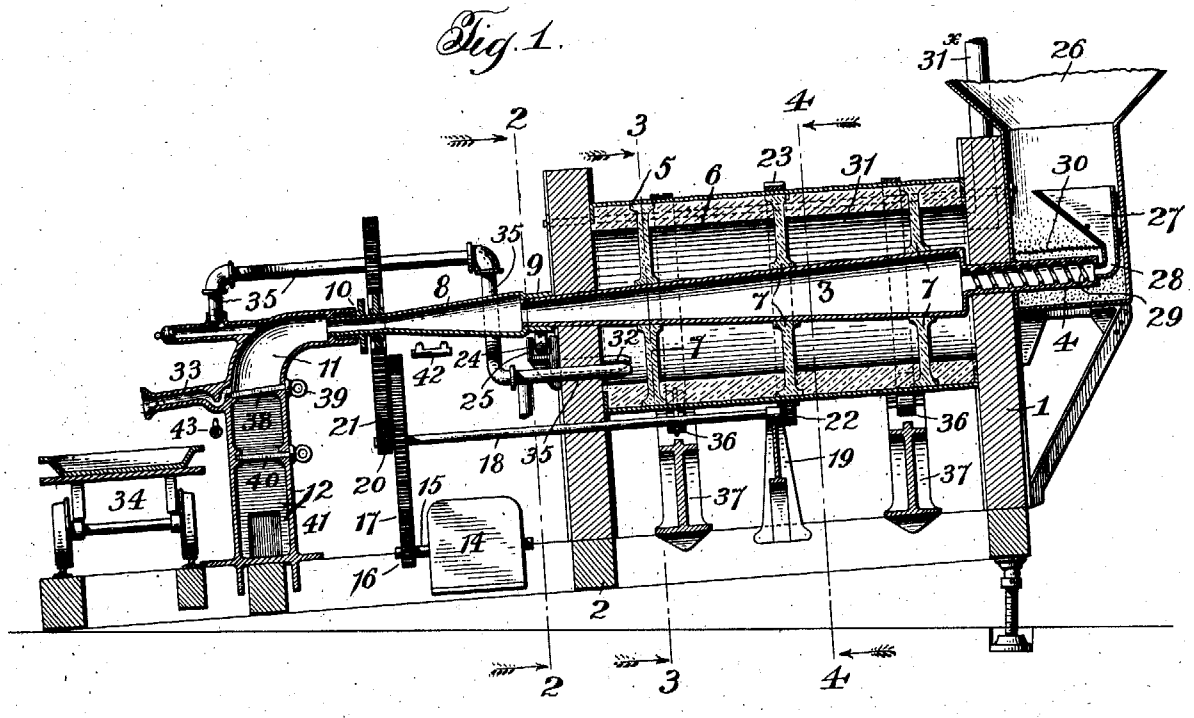
Figure 2:
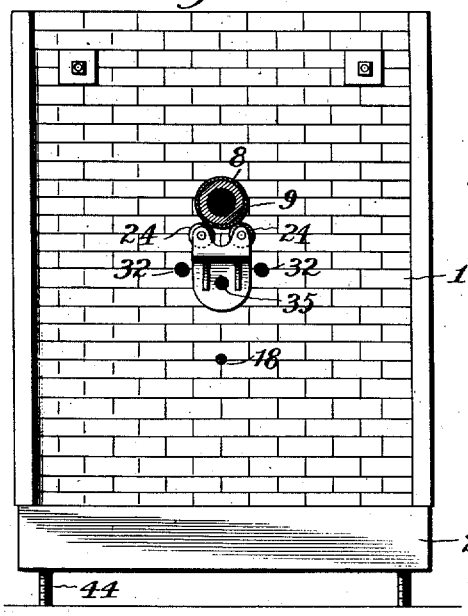
Figure 3:
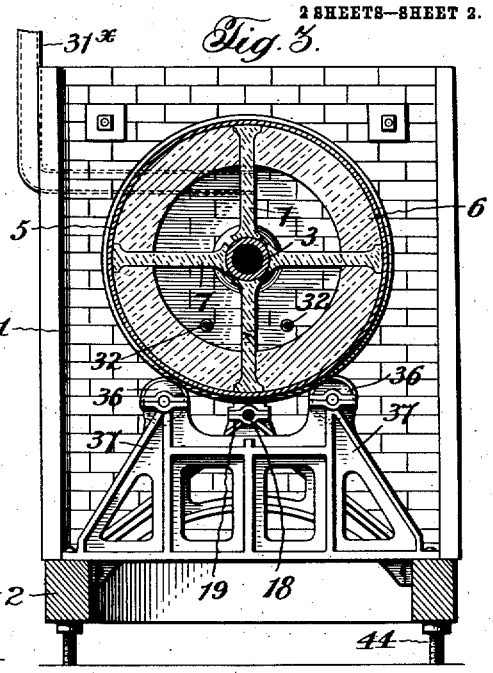
Figure 4:
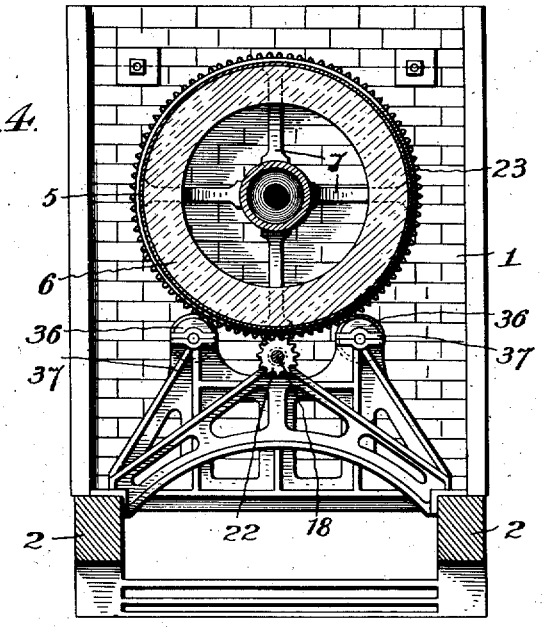

In the accompanying drawings, Figure 1 is a central longitudinal section of a furnace embodying my improvements; Fig. 2 is a vertical section taken on the line 2—2 of Fig. 1, looking in the direction indicated by the arrow *s*. Fig. 3 is a vertical section taken on line 3—3 of Fig. 1; and Fig. 4 is a similar view taken on line 4—4 of Fig. 1.

In the accompanying drawings, which are for illustrative purposes only and therefore not drawn to scale, the numeral 1 indicates the fire brick and walls, and 2 the base of a supporting structure upon which rest the bearing brackets 37, supporting the revolving furnace holding the retort, 3. The retort 3, which is of tubular, and may be of gradually tapering form, is arranged with one end projecting through and beyond one of the end walls, and terminates at its opposite end in a tubular feed extension 4, which projects through the other end wall. Surrounding and entirely inclosing the retort 3 is a cylindrical steel casing, 5, provided with an inner lining 6 of fire brick, the retort 3 being held in the proper relation by radial braces 7 extending between the same.

A hollow tube 8 has its inner end coupled or connected to the projecting end 9 of the retort 3 in any suitable manner and its opposite end extends through a stuffing box, 10, arranged at the outer end of the upper hollowed-out portion, 11, of an upright frame, 12, the tube 8 constitutes a condensing chamber and the hollowed-out portion of the frame 12 a continuation thereof. The tube 8 and retort are rotated together by the following means. A motor 14 is arranged near the rear end wall, the shaft 15 of which is provided at one end with a pinion 16, which intermeshes with a large gear wheel 17 keyed or otherwise fixed to the rear end of a shaft 18 extending through the front end wall 1, and through a bearing 19 arranged beneath the center of the furnace and upon the supporting base 2. The gear 17 is also provided on one face with a pinion 20 which intermeshes with a second larger gear 21 keyed to the tube 8. The front or inner end of the shaft 18 is provided with a pinion 22 which intermeshes with a gear 23 on the revolving furnace, it being understood that the pinions 20 and 22, respectively, and the gears 21 and 23 respectively, are of corresponding dimensions in order that the furnace and the tube 8 will turn at exactly the same speed. The inner end of the tube 8 turns upon a pair of roller bearings 24 mounted at the upper end of a supporting bracket 25 bolted to the rear end wall 1 of the supporting structure.

In feeding the ore to the retort, it is first placed in the main hopper 26 from which most of it passes into the secondary hopper 27, and thence through a tube 28 extending from the lower end of the latter into the feed extension 4 of the retort, the inner surface of said extension being provided with a feed screw 29 to feed the material into the heated portion or body of the retort. A screen support 30 is arranged in the lower end of the main hopper 26 and supports a quantity of the granulated ore and thus prevents the weight of the ore in the large hopper from bearing heavily on the front end of the feed extension 4 of the retort. The hoppers being at all times full of ore mixture prevents the entrance of air into the retort, which is absolutely necessary in distilling zinc ores for the recovery of metallic zinc. The annular space 31 between the retort and the steel casing 5 provides a combustion chamber which is heated by oil or gas burners 32 which extend through the front wall 1 into said chamber. The flue or uptake is shown at 31[x] in the front wall. The zinc vapor passes through the condensing chamber or tube 8 which provides for the proper condensation of the same, and after it is condensed passes through the duct 33 in a molten state to the collecting pan of a suitable truck 34 by means of which it may be transferred to any desired point. The carbon monoxid gas which is generated by reducing the zinc ore passes into the pipe 35 by means of which it is led into the combustion chamber 31, preferably at a point between the burners 32 and is used as an auxiliary fuel in maintaining the desired heat in said chamber. The steel casing 5 turns or rotates upon two pairs of bearing rollers 36 mounted upon the upper ends of bearing brackets 37.

It is to be particularly observed that by coupling the tube 8 to the retort in the manner disclosed, a tube of any size or length may be provided to provide a condensing chamber of such length that the zinc vapor will be condensed to the proper degree before passing through the duct 33 on the bed of the truck. The residue of the ore is deposited upon a slide 38 mounted in the frame 12, it being evident that by pulling this slide out by means of its handle 39 the residue will fall upon a second similar slide 40 and by pulling out the latter after closing the former, will fall into the space 41 from which it may be removed as desired without admitting air to the retort.

As heretofore stated, the condensing chamber may be made of the exact size and kept at the exact temperature for the perfect condensation of the zinc fumes, thus reducing to a minimum, the formation of "blue powder". In this connection, it may be said that under the present practice, the formation of blue powder often amounts to as much as one-half the zinc originally discharged into the retort and that this powder has to be redistilled only to be formed again and again.

To insure proper temperature for the condensers the auxiliary gas heaters 42 may be used, if necessary. An auxiliary gas heater, 43, may be also arranged beneath the duct 33 to keep the zinc in a molten state.

I further find that by the use of my construction, every particle of the ore is brought into direct contact with the heat and carbon at once without subjecting the ore to a lower temperature while the heat is being driven from the outside of the retort, as under present methods, into the center of the mass of ore, which requires considerable time and an excess of heat against the retort walls in order to obtain a sufficiently high temperature in the interior of the mass. My construction is such as to bring the ore into direct contact with the heat at once and distillation is immediate and constant.

The base 2 of the furnace is held at the proper inclination to feed the ore through the retort and condenser at the desired rate of speed. This may be accomplished by raising or lowering the feed end of the furnace by lifting jacks 44.

From the foregoing description, taken in connection with the accompanying drawings, the construction and operation of the invention will be readily understood without requiring a more extended explanation.

Various changes in the form, proportion and the minor details of construction may be resorted to without departing from the principle, or sacrificing any of the advantages of the invention as defined in the appended claims.

Having thus described my invention, what I claim as new and desire to secure by Letters Patent is:—

1. In a revolving furnace for volatilizing ore, a revolving retort, a revolving condensing chamber coupled to the retort, and means for feeding the material into the retort automatically.

2. In a revolving furnace for volatilizing ore, a revolving retort, a cylindrical casing having an inner lining of refractory and non-heat conducting material surrounding and adapted to rotate with the retort, providing an annular combustion chamber between the retort and casing, a condenser tube coupled to the retort, means for feeding the material into the retort during rotation, and means for feeding fuel to the combustion chamber.

3. In a furnace of the class described, a revolving retort, a cylindrical casing provided with an inner layer or lining of refractory and non-heat conducting material surrounding the retort and adapted to rotate therewith, leaving a combustion chamber between the retort and casing, means for feeding ore into the retort, a condensing chamber for the ore vapors, means for leading the carbon monoxid gas generated by volatilizing the ore to the combustion chamber, and means for feeding fuel to the combustion chamber.

4. In a furnace of the class described, a revolving retort provided with a tubular trunnion bearing having an interior thread forming a feed screw, a main hopper inclosing the outer end of the trunnion bearing of the retort, a secondary hopper in the main hopper, said secondary hopper having a tube leading into the trunnion bearing, a support in the main hopper beneath the body of the secondary hopper, and means for heating the retort.

5. In a furnace of the class described, a revolving retort provided with a tubular trunnion bearing having an interior thread forming a feed screw, a main hopper inclosing the outer end of the trunnion bearing of the retort, a secondary hopper in the main hopper, said secondary hopper having a tube leading into the trunnion bearing, a support in the main hopper beneath the body of the second hopper, means for heating the retort, and means for condensing the zinc vapors.

6. In a furnace of the class described, a revolving retort, a condenser tube coupled to one end of the retort, an upright frame having an upper hollow portion communicating with the outer end of the condenser tube and forming a continuation thereof, said frame also having a duct for leading the condensed ore to a suitable receiver, a slide in said frame at a point near said duct, and means for heating the retort.

7. In a furnace of the class described, a revolving retort, a condenser tube coupled to one end of the retort, an upright frame having an upper hollow portion communicating with the outer end of the condenser tube and forming a continuation thereof, said frame also having a duct for leading the condensed ore to a suitable receiver, a slide in said frame at a point near said duct, means for heating the retort, and means for leading the carbon monoxid gas generated by volatilizing the ore to the combustion chamber, and means for excluding air from the chamber of the retort.

8. In a furnace for volatilizing metallic zinc from its ores, a revoluble retort, means for revolving the retort, a condensing chamber in communication with the retort, means for supplying material to the retort during rotation, and means permitting the withdrawal of the condensed metal from the condenser.

9. In a furnace for volatilizing metallic zinc from its ores, a rotary retort, a furnace surrounding the retort means for revolving the retort, and a condenser located at the discharge end of the retort and into which the zinc fumes and residue is deposited from the retort.

10. In a furnace for volatilizing metallic zinc from its ores, the combination with a furnace, of an inclined revoluble retort, means for turning the retort, a condenser connected to the discharge end of the retort so as to receive therefrom the zinc fumes and residue, and means for feeding material to the retort during rotation.

11. In a furnace for volatilizing metallic zinc from its ores, a retort mounted for rotation, a furnace surrounding the retort, means for revolving the retort, a condenser into which the retort discharges, and a sealed discharge for the condenser.

12. In a furnace for volatilizing metallic zinc from its ores, the combination with an inclined retort, a rotary furnace carrying the retort, a condenser into which the retort discharges, and a sealed outlet for the condenser.

13. In a furnace for volatilizing metallic zinc from its ores, a rotary retort, a furnace within which the retort is located, means for turning the furnace retort, and auxiliary turning means for said retort remotely located relative to the said other turning means for the purposes stated.

14. In a furnace for volatilizing metallic zinc from its ores, a rotatable retort, means for heating the retort, means for supplying material to one end of the retort, a condenser into which the retort discharges, a sealed outlet for the condenser, and a gas escape leading from the condenser.

15. In a furnace for volatilizing metallic zinc from its ores, the combination with a rotatable furnace, a retort supported within the furnace and having extensions leading through the end walls thereof, a feed hopper communicating with one end of the retort, a condenser communicating with the opposite end of the retort, and means for rotating the furnace and retort.

16. In a furnace for volatilizing metallic zinc from its ores, the combination with a furnace, of a retort located within the furnace having its end portions projecting through the end walls of the furnace, a feed at one end of the retort, and a condenser communicating with the opposite end of the retort so as to receive the zinc fumes and residue therefrom.

17. In a furnace for volatilizing metallic zinc from its ores, the combination with a rotatable retort, a rotatable furnace within which the retort is positioned and through the end walls of which parts of the retort project, means for supporting the retort within the furnace, means for supporting portions of the retort without the furnace, and means for rotating the retort.

18. In a furnace for volatilizing metallic zinc from ores, the combination with a furnace, of a retort located therein and projecting beyond the same, means associated with the projecting end of the retort for rotating the same, and means associated with the retort within the furnace for also rotating the said retort.

19. In a furnace for volatilizing metallic zinc from ores, a retort, means for heating the retort, means for supplying the retort with material comprising a receptacle located at the end thereof, a feed hopper within the receptacle and communicating with the end of the retort, and means for turning the retort.

20. In a furnace for volatilizing metallic zinc from ores, the combination with a furnace mounted for rotation, of a retort supported within the furnace and having one end projecting beyond the furnace, an anti-friction bearing for said projecting end, means for turning the furnace and the retort, and means independent of the furnace associated with the projecting end of the retort for assisting in the turning thereof.

21. In a furnace for volatilizing metallic zinc from ores, a retort within the furnace, a feed entering the end of the retort comprising a hopper, a container surrounding the hopper and into which the end of the retort projects, and a protecting screen above the projecting end of the retort within the said container.

22. In a furnace for volatilizing metallic zinc from its ore, the combination with a rotating retort, a condenser for the zinc fumes in communication with said retort, a feed for the retort, means permitting the removal of metallic zinc from the condenser, means for sealing the joints against the ingress of air, and means for preventing air from entering the feed end of the retort.

In testimony whereof I affix my signature in the presence of two witnesses.

HARRY H. HUGHES.

Witnesses:
WILLIAM E. BLANTON,
HIRAM D. CHINN.